(12) United States Patent
Reghunathan

(10) Patent No.: US 6,381,652 B1
(45) Date of Patent: Apr. 30, 2002

(54) HIGH BANDWIDTH PROCESSING AND COMMUNICATION NODE ARCHITECTURES FOR PROCESSING REAL-TIME CONTROL MESSAGES

(75) Inventor: Panchanathan Reghunathan, Thousand Oaks, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/333,390

(22) Filed: Jun. 15, 1999

(51) Int. Cl.[7] ............................................... G06F 15/16
(52) U.S. Cl. ....................................................... 709/250
(58) Field of Search ................................. 709/250, 212, 709/217, 253

(56) References Cited

U.S. PATENT DOCUMENTS

| | | | | |
|---|---|---|---|---|
| 5,041,963 A | * | 8/1991 | Ebersole et al. | 370/407 |
| 6,170,025 B1 | * | 6/2001 | Drouttar et al. | 710/48 |
| 6,260,071 B1 | * | 7/2001 | Armistead et al. | 709/238 |

* cited by examiner

Primary Examiner—David Y. Eng
(74) Attorney, Agent, or Firm—Leonard A. Alkov; Glenn H. Lenzen, Jr.

(57) ABSTRACT

An architecture for processing time-critical real-time control messages in a large real-time processing system. Control messages are separated from block data transfers and identical but separate links are used to transfer the block data and control messages. One embodiment of the architecture 30 has one control link shared by multiple processing nodes while each node 10 has a separate high bandwidth data link.

3 Claims, 3 Drawing Sheets

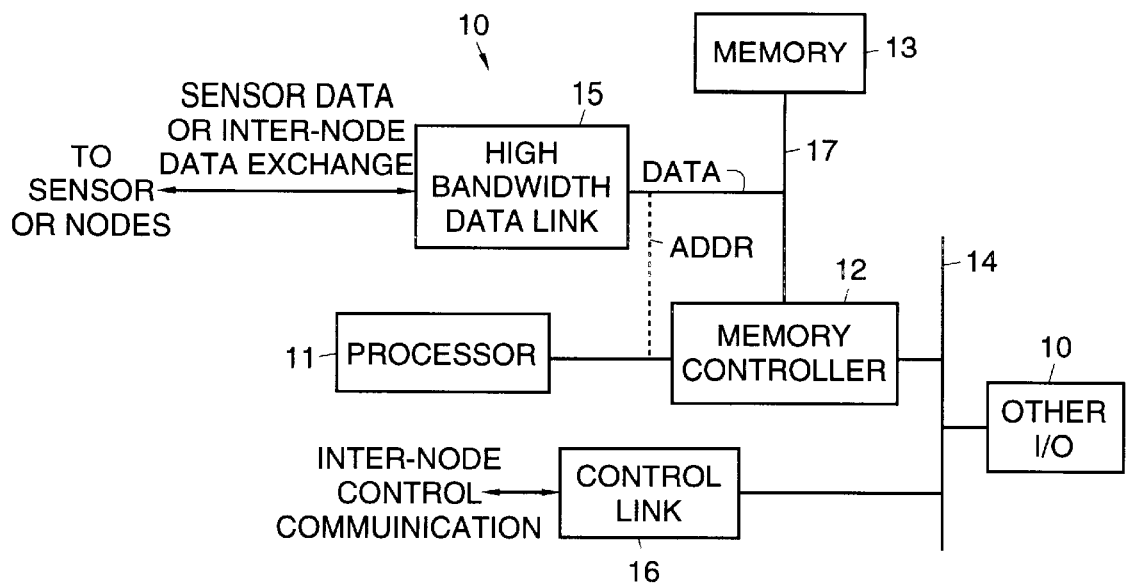
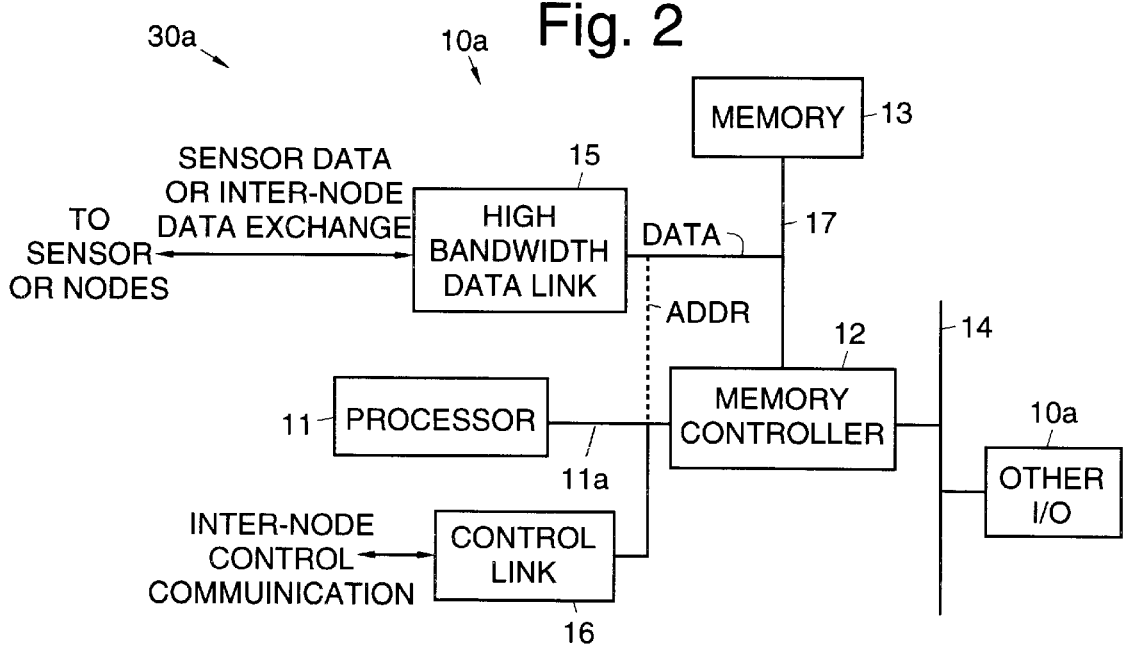

HIGH BANDWIDTH PROCESSING AND COMMUNICATION NODE ARCHITECTURES FOR PROCESSING REAL-TIME CONTROL MESSAGES

BACKGROUND

The present invention is related generally to processing architectures, and more particularly, to processing and communication node architectures that process real-time control messages and data transfers to and from memory.

Currently, in a large real-time system, it becomes a problem handling time-critical control messages between subsystems or nodes of the system, particularly when they are mixed with large block data transfers. This problem affects predictability and determinism of latencies for critical messages.

Currently available technology solves the problem of handling time-critical control messages using one of two approaches. The first approach is to implement priority schemes to give priority to time-critical control messages over block data transfers. Alternatively, the second approach uses one type of communication media for control that has a low bandwidth (such as a 1553 bus), and a dedicated link to each processing node.

The first approach lacks commercial support and requires non-standard communication protocols and a one-of-a-kind implementation that is expensive. This first approach also adds complexity and unpredictability to the communication network. The second approach requires two different communication protocols for each node, one for moving data among nodes at a reasonable bandwidth (such as a VME bus) and a different protocol and bus for handling control messages (such as a 1553 bus).

Thus, with regard to the conventional processing architectures, the two alternative design approaches do not offer high bandwidth I/O at low cost. In the first approach, one must live with the bandwidth limitation of other intermediate busses such as PCI, VME, or Raceway busses, for example, or a variety of local busses that provide much less than 500 MB/sec memory bandwidth (and that typically have a peak bandwidth of about 120 to 160 MB/sec). In other words, the high bandwidth I/O device passes data through and is limited by intermediate low bandwidth busses before arriving at the memory. In the second approach, expensive memory controllers and dual port structures are built without taking advantage of low cost commercial processor support chips to provide increased bandwidth to local memory. However, this approach still falls short of a desired half-gigabyte to one gigabyte bandwidth access to memory (which typically requires several ASICs per processor type and providing about 200 to 300 MB/sec).

There are a great number of applications that need or can take advantage of a high bandwidth (500 MB/sec or greater) DMA access to a processor memory at the Low node level. Examples include radar signal processing, electro-optic image enhancement, automatic target recognition, autotracking and image compression applications. There is also a need for an interconnected cache coherent system, both in symmetric multiprocessing (SMP) architectures and in distributed shared memory architectures.

Accordingly, it is an objective of the present invention to provide for improved processing and communication architectures that efficiently process real-time control messages and data transfers to and from memory and that overcome the limitations of the conventional approaches outlined above. It is an objective of the present invention to provide for processing and communication architectures that segregate the control link from the high speed data link. It is another objective of the present invention to provide for processing and communication architectures wherein multiple input/output nodes share a single control link. It is yet another objective of the present invention to provide for processing and communication architectures wherein the high speed data link is directly interfaced to memory and appears as a processor to the memory.

SUMMARY OF THE INVENTION

To meet the above and other objectives, one aspect of the present invention is an architecture that efficiently processes time-critical real-time control messages in a large real-time system. The present invention separates control messages from block data transfers and uses identical but separate links to transfer the block data and control messages. One embodiment of the present invention has a single control link shared by multiple processing nodes (to provide for an economy of scale) while each node has an individual high bandwidth data link.

The present invention separates control messages from block data transfers at a node level and shares a single control link among multiple nodes or subsystems. The present invention allows a single control node to process control messages destined for multiple nodes and deliver them to the respective nodes with low latency. The present invention provides low a latency message transmission mechanism as well, picking up control messages from nodes and transferring them by way of a single control link. The present invention, while separating control messages from block data transfers using separate physical links to achieve low latency and predictability, provides a unified protocol for control and data.

One specific implementation uses a shared scalable coherent interface (SCI) control link (either parallel or serial SCI) that serves multiple processing nodes to handle time-critical control messages. Each node has its own 500 MB/sec parallel SCI link to handle block data transfers among nodes or from external sensors. The shared SCI control link handles control messages for all nodes. Thus, a high bandwidth node architecture is provided that allows gigabyte per second I/O bandwidth data transfers directly to processor memory.

The present invention uses a high bandwidth I/O device that mimics (interfaces and behaves like) a second processor and uses multiprocessor support features of a commercial microprocessor and support chips to tie directly to memory using minimal "glue" logic. The present invention provides a cache coherent direct memory access link that allows a low cost implementation of a distributed cache coherent system.

The present architecture provides high bandwidth direct memory access and does so with minimal design complexity by using multiprocessing or coprocessing features of existing and planned commercial microprocessors and their support chips. The support for a cache coherent high bandwidth link allows building of low cost symmetric multiprocessing clusters or distributed shared memory architectures.

The present invention improves upon three specific aspects of high bandwidth processing nodes. The present invention provides two alternative ways to connect a high bandwidth I/O link to the node. The present invention provides a simple way of making a high bandwidth I/O device interface like a second processor to commercial microprocessors and support chips (using the multiprocessor support features) to simplify device interface. The present invention specifically provides for the design of a high bandwidth processing node using Power PC™603/603e/604 processor with an MPC-106 controller and a 500 MB/sec scalable coherent interface (SCI) having direct access to memory. The implementation uses DRAM and a flash EPROM.

The present invention may be adapted for use in radar and electro-optical systems and integrated core processing systems. It may also by used in a wide variety of other signal processing applications. The present invention is well-suited for use with large real-time systems such as a radar system, electro-optical system or an integrated core processing system, for example.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates a processing and communication node architecture in accordance with the principles of the present invention;

FIG. 2 illustrates an alternative processing and communication node architecture in accordance with the principles of the present invention;

DETAILED DESCRIPTION

Figure 3:
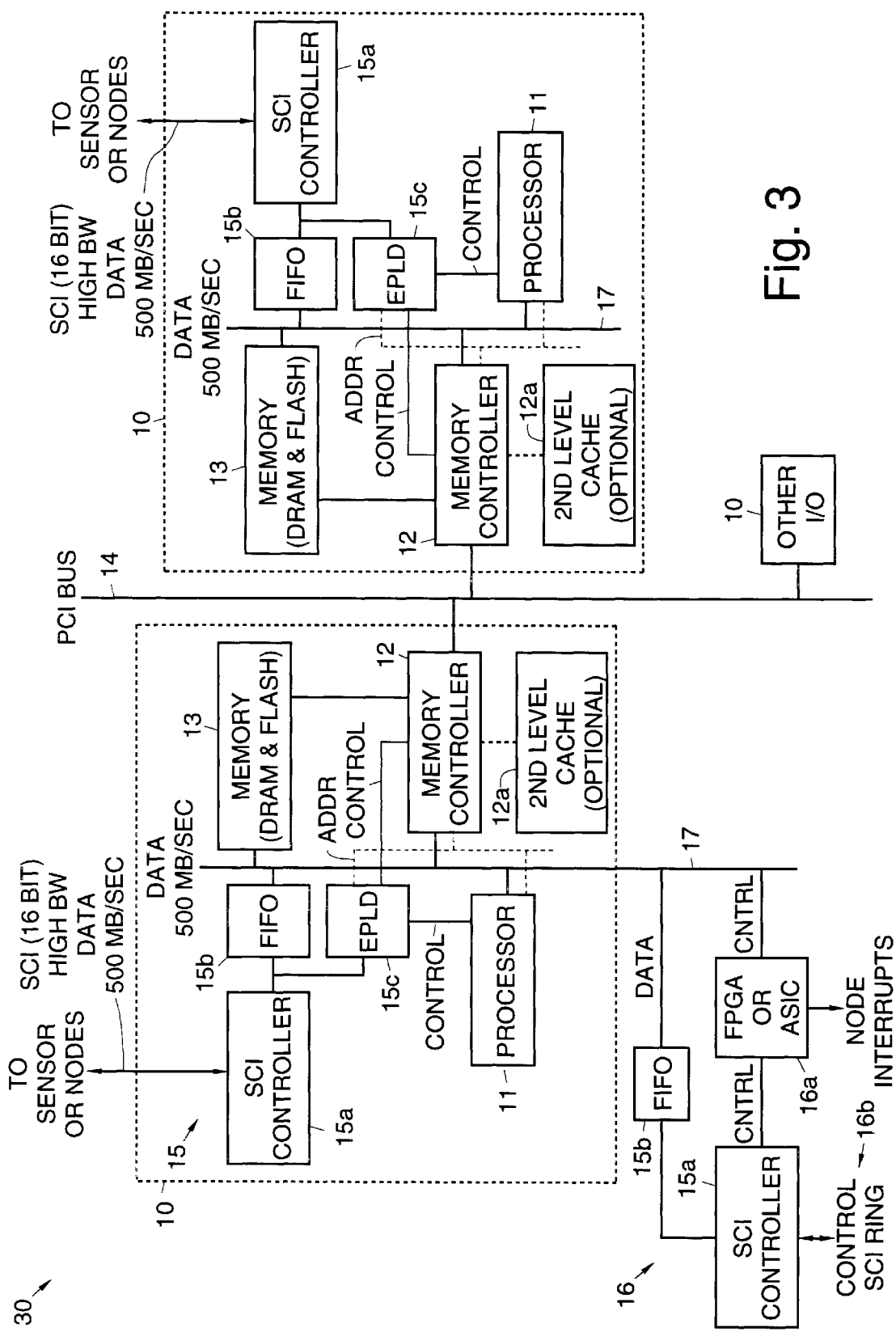
FIG. 3 illustrates an exemplary embodiment of a control kink implemented using processing and communication nodes in accordance with the present invention.

Referring to the drawing figures, FIG. 1 illustrates an architecture 30 of an integrated processing and communication node (I/O node) 10 implemented in accordance with the principles of the present invention. A processor 11 is coupled by way of a memory controller 12 and a memory data bus 17 and to a memory 13. The memory controller 12 is also coupled to a local bus 14 and interfaces to other I/O nodes 10 that share a control link 16. The node 10 has a high bandwidth I/O link 15 that is coupled to the memory controller 12 and memory 13. The high bandwidth I/O link 15 is used to move data between nodes 10 and from external sensors to the memory 13 or to other nodes 10. Memory addresses (ADDR) indicative of where the transferred data is stored in the memory 13 are routed to the processor 11. The I/O link 15 moves the data at high data rates to and from the memory 13. Control messages are transmitted over the control link 16 and are coupled by way of the local bus 14 through the memory controller 12 to the memory 13. Additional I/O nodes 10 (having high bandwidth data links 15) that are integrated into the architecture 30 are coupled to the memory controller 12 by way of the local bus 14.

FIG. 2 shows an architecture 30a that implements an alternative integrated processing and communication node 10a in accordance with the principles of the present invention. The control link 16 and data link 15 share the same path to the memory 13 by way of the memory data bus 17, but separately communicate with devices outside the node 10a. In the architecture 30a of the node 10a shown in FIG. 2, a separate control link 16 is needed for each node, but all data and control links 15, 16 have the same protocol. For example, the data link 15 may be a 16-bit parallel scalable coherent interface (SCI), while the control link 16 may be a serial scalable coherent interface.

In the nodes 10, 10a shown in FIGS. 1 and 2, memory addresses from the data link 15 pass through the memory controller 12 while data is transferred directly to the memory 13 by way of the memory data bus 17. Alternatively, the memory addresses time share driving the memory address and strobes (NOTE: please explain or clarify this sentence). The control link 16 in the node 10a of FIG. 2 is coupled to the processor bus 11a.

FIG. 3 shows how a single control link 16 is shared by multiple nodes 10. In the architecture 30 shown in FIG. 3, the data link 15 includes a SCI controller 15a that is coupled to a first-in, first-out (FIFO) buffer 15b and an electronically programmable logic device (EPLD) 15c or EPROM 15c. The FIFO buffer 15b couples the SCI controller 15a to the memory data bus 17, while the EPLD 15c couples control signals from the SCI controller 15a to the processor 11 and memory controller 12. In the embodiment of FIG. 3, SCI controller 15a may be a Dolphin LC-II controller chip 15a, for example, the processor 11 may be a Power PC 603, 603e or 604 chip 11, for example, and the memory controller 12 may be an MPC-106 controller chip, for example, that is coupled to an optional level two or second level cache 12a.

FIG. 3 also shows an implementation of the present invention wherein a field programmable gate array (FPGA) 16a or an application specific integrated circuit (ASIC) 16a interfaces between a Dolphin LC-II SCI controller chip (the SCI controller 15a) and the PCI bus 14 and processes all control messages destined for any of the nodes 10 coupled to the local bus 14, sorts them and routes them to the destined node 10. Conversely, when any of the nodes 10 want to send a control message, they simply inform the FPGA 16a or ASIC 16a and it will pick up the message, frame it appropriately, and send it on the shared control link 16. If the message is for other nodes 10 coupled to the same local bus 14, it will identify and deliver the message to the addressed node 10.

In FIG. 3, each of the nodes 10 have a dedicated high bandwidth data link 15, which may be a 500 MB/Sec 16-bit parallel SCI link. These data links 15 may be connected in a ring or connected separately by way of an interconnect switch (not shown). The data links 15 are primarily used for block data transfers, either among the nodes 10 or from sensors to the processing nodes 10.

Both the control SCI link 16 and the data SCI link 15 have the same protocol. By simply addressing data to different memory mapped locations, the data is transparently dispatched from the memory 13 to the respective link 15, 16. Therefore, to software running on the processor 11, the node 10 looks like a single communication link for both data and control, thereby minimizing complexity. The control SCI link 16 may be lightly loaded to minimize latency. The data link 15 may be fully loaded to extract maximum bandwidth use.

When control messages are separated and sent on the separate control link 16, one can implement security features and critical message retransmission schemes to provide for a secure system. These security features and complex retransmission schemes are unnecessary for the data links 15, in that they are often point to point and can be retried at a high level.

Thus, the present invention segregates time critical control messages from block transfers and at the same time provides identical protocols for both types of transfers, along with the controller 16 that shares a single control link 16 among multiple nodes 10. This architecture 30 makes the present invention an attractive low cost alternative to existing approaches.

FIG. 3 also shows an implementation of the present architecture 30 using off-the shelf parts to provide high bandwidth processing nodes 10. FIG. 3 illustrates how multiprocessing support features in an MPC-106 memory controller chip 12 can be used to make the high bandwidth I/O device 15 look like another processor 11, thus minimizing control interface. This design provides a 500 MB/sec direct memory access interface to the memory 13. FIG. 3 illustrates how the Dolphin LC-II SCI controller chip 15a may be tied to memory using very minimal logic.

The high bandwidth I/O device 15 looks like another PowerPC-603 or 604 processor 11 to the MPC-106 memory controller 12. The cache coherent SCI bus and the cache coherent BLINK bus (of the LC-II controller chip 15a) in conjunction with the direct access to the memory control and data bus allows the implementation of distributed shared memory architectures or symmetric multiprocessing architectures. The processing nodes 10 are on the SCI ring to provide high bandwidth cache coherent communication among the nodes 10.

Figure 4:
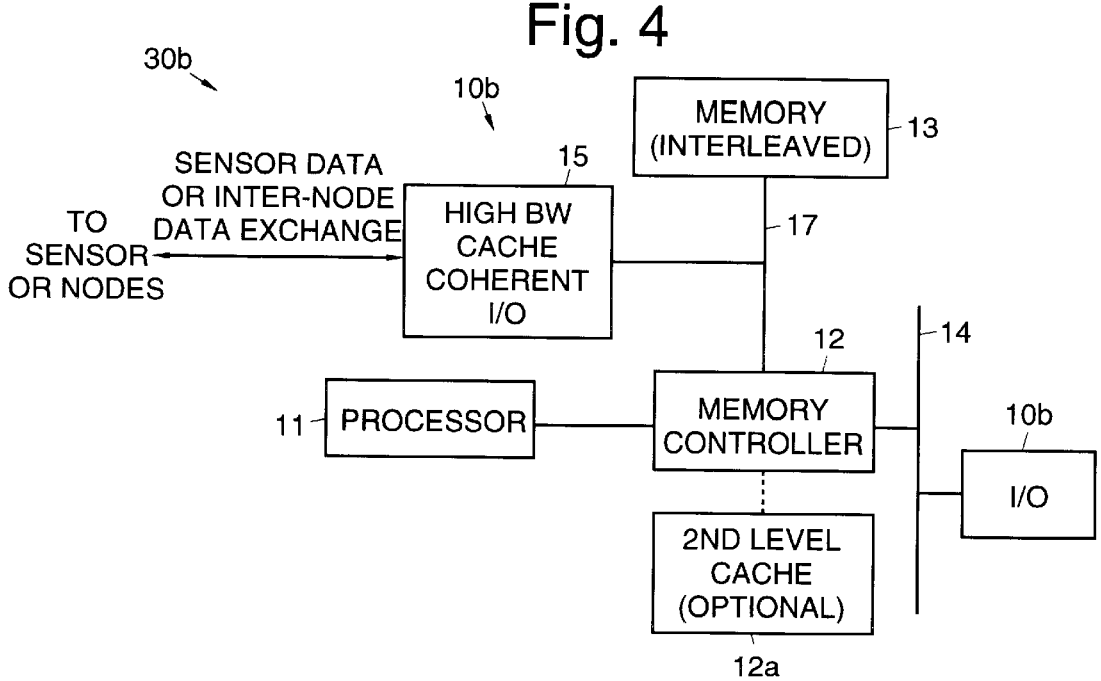
FIG. 4 illustrates a high bandwidth processing node in accordance with the present invention.

Referring now to FIG. 4, it shows the architecture 30b of a processing node 10b for directly connecting a high bandwidth I/O device 15 to the memory data bus 17. A second level cache 12a is optionally coupled to the memory controller 12. The I/O device 15 is coupled to control and data lines of the memory 13. The I/O device 15 has a priority to drive the memory data bus 17. If the high bandwidth I/O device 15 does not need to pass data to the memory 13, it lets the memory controller 12 drive the memory control lines. A control handshake signal decides which device (the I/O device or the controller 12) will address the memory 13 on the next clock cycle so both the I/O device 15 or the controller 12 do not drive the memory control lines simultaneously. In the case of DRAM memory 13, there can be two separate row address strobe (RAS) and column address strobe (CAS) that are "ORed" to drive the memory 13. Also, when using an interleaved memory 13, the high bandwidth I/O device 15 can address one bank while the processor 11 addresses the other bank at the same time.

Figure 5:
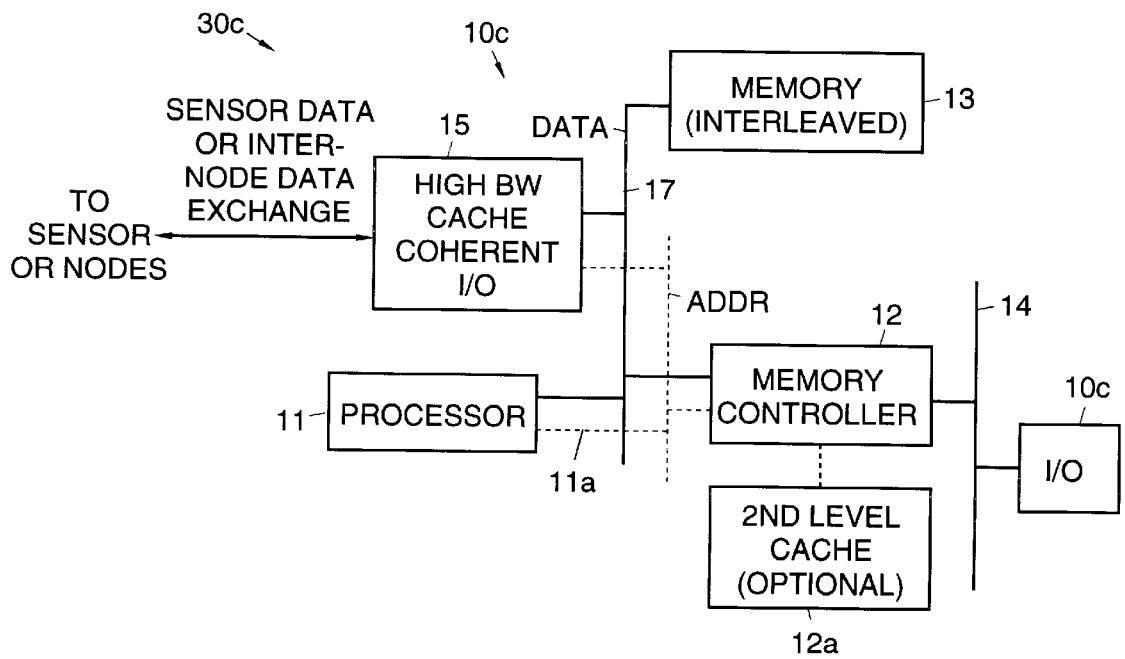
FIG. 5 illustrates an alternative high bandwidth processing node in accordance with the present invention.

Referring to FIG. 5, it shows the architecture 30c of a processing node 10c wherein the high bandwidth I/O device 15 and the processor 11 are connected to the same processor address and control bus (ADDR), while each device has direct interface to the memory data bus 17. In the embodiment of FIG. 5, the memory controller 12 is shared between the high bandwidth I/O device 15 and the processor 11.

In FIG. 5, the high bandwidth I/O device 15 acts like a second processor 11. The high bandwidth I/O device 15 uses multiprocessor support features of the memory controller 12 and the processor 11. In the embodiment of FIG. 5, either the processor 11 or the high bandwidth I/O device 15 must request and capture the processor bus 11a before they can start to use them (i.e., no default ownership). Once the respective processor 11 or the high bandwidth I/O device 15 captures the processor bus 11a, the capturing device can use it until it is done, without the fear that control will be lost. The multiprocessor support features allow the address and control busses to be assigned to either the high bandwidth I/O device 15 or to the processor 11 for the entire duration and arbitration is built into the memory controller chip 12, requiring no external logic.

Either the processor 11 or the high bandwidth I/O device 15 can use the second level cache 12a or the memory 13.

Thus, processing and communication node architectures that process real-time control messages and data transfers to and from memory have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. An architecture for a processing and communication node comprising:

a memory;

a memory controller coupled to the memory;

a processor coupled to the memory controller and the memory by way of a memory data bus;

a high bandwidth I/O link coupled to the memory controller and memory for moving data at high data rates between memories of coupled nodes or from external sensors to the memory of the node that interfaces and behaves like a second processor and uses multiprocessor support features to tie directly to the memory;

a control link coupled to the memory controller and to the memory for processing control messages coupled from the coupled nodes or from the external sensors.

2. The architecture of claim 1 further comprising a local bus coupled to the memory controller.

3. The architecture of claim 2 further comprising a plurality of processing and communication nodes coupled into the architecture by way of the local bus.

* * * * *